Patented Nov. 19, 1946

2,411,148

UNITED STATES PATENT OFFICE 2,411,148

ANTHRAQUINONE DYESTUFFS

Joseph B. Dickey and James G. McNally, Rochester, N. Y., assignors to Eastman Kodak Company, Rochester, N. Y., a corporation of New Jersey No Drawing. Application October 23, 1943, Serial No. 507,486

5 Claims. (Cl. 260—376)

This invention relates to the manufacture of new anthraquinone dyestuffs and to the coloration with such dyestuffs of materials made of or containing cellulose derivatives.

We have found that anthraquinone dyestuffs containing both a hydroxyalkyl group (or radicle) and a hydroxyalkyl group (or radicle) esterified with an organic acid radicle are especially suited for the coloration of materials made of or containing cellulose derivatives, e. g. organic derivatives of cellulose. Such new dyestuffs and the coloration of materials therewith are set forth in our copending application Serial No. 306,200, filed November 25, 1939, now Patent 2,338,908, of which the instant application is a continuation-in-part.

The dyestuffs of our invention can be prepared in various ways, but are advantageously prepared by esterifying a dyestuff containing two or more hydroxyalkyl groups, under controlled conditions, so that at least one of the hydroxyalkyl groups remains unesterified. Thus, in a dyestuff containing two hydroxyalkyl radicles, one hydroxylakyl radicle can be esterified by reacting the dyestuff with about one molecular equivalent of an organic acid anhydride, or an organic acid halide, or an organic acid (in this latter case, in the presence of a suitable catalyst), i. e. with about enough of the organic acid anhydride, organic acid halide or organic acid to esterify substantially but one of the hydroxyalkyl groups. The exact chemical reaction taking place is not known. The probabilities are that both hydroxyalkyl groups are esterified to some extent. However, by employing about one molecular equivalent of esterifying agent, the esterified product consists essentially of dyestuff wherein but one of the hydroxyalkyl groups is esterified and the other hydroxyalkyl group is not esterified.

Both aliphatic and aromatic (aryl) esterifying agents can be employed. Usually a solvent or diluent medium, nonreactive with the esterifying agent, is present in the reaction mixture. If an organic acid anhydride or an organic acid halide is employed as an esterifying agent, the esterification is advantageously effected in the presence of a tertiary amine, such as pyridine or dimethylaniline. The tertiary amine tends to combine with the hydrogen halide or the organic acid generated during the esterification reaction. Still other diluent agents, such as ethylene chloride, dioxane or ethyl acetate, may be present.

Illustrative hydroxyalkyl groups which may be present in the starting dyestuff include those present in hydroxyalkyl amino groups such as:

—NHCH₂CH₂OH
—NHCH₂CHOHCH₃
—NHCH₂CH₂CH₂OH
—NHCH₂CHOHCH₂OH
—NHCH₂CH₂CH₂CH₂OH
—N(C₂H₄OH)₂
—N(CH₂CHOHCH₂OH)₂ and

—N(CH₂CH₂CH₂OH)₂ as well as the hydroxyalkyl groups present in hydroxyalkyl arylamino groups, such as the following:

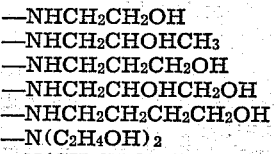

and

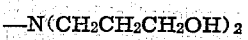

Still other hydroxyalkyl groups may be present in groups such as the following:

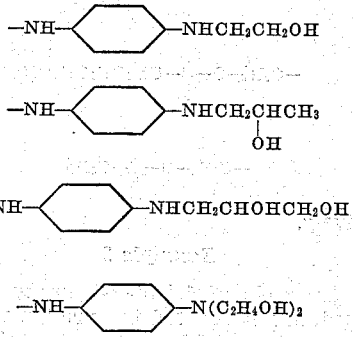

and

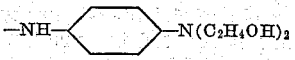

The starting dyestuffs containing the hydroxyalkyl groups are described in the prior art. In the case of anthraquinone compounds, hydroxyalkylamino derivatives can be prepared by condensing a leuco anthraquinone with a hydroxyalkylamine, such as ethanolamine, diethanolamine, propanolamine, butanolamine, cyclohexanolamine, etc., and oxidizing the resulting leuco compound to the non-leuco form. Suitable leuco anthraquinones include, for example, leuco quinizarin, leuco 1,4,5-trihydroxy anthraquinone, etc.

Esterification agents, which can be employed in the preparation of our new dyestuffs, include, for example, acetic anhydride, propionic anhydride, propionyl chloride, acetyl chloride, benzoyl chloride, methoxy acetic anhydride, butyric anhydride, succinic anhydride, tetrahydrofuroyl chloride, phthalic anhydride, palmitic acid chloride, furoic anhydride, adipic anhydride, oleic acid chloride, furoic acid chloride, methyl chloro carbonate, ethyl chloro carbonate, tetrahydrofuroyl carbonate, cyclohexyl carbonate, furoyl chloro carbonate, allyl chloro carbonate, formic acid with sulfuric acid catalyst and glycollic acid with sulfuric acid catalyst.

The following examples will serve to illustrate further our invention.

Example 1

0.1 gram mole of 1,4-di-β-hydroxyethylamino anthraquinone is reacted in pyridine with 10 grams of chloroacetic acid.

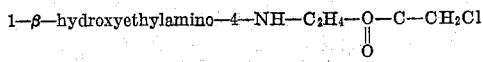

anthraquinone is obtained and colors cellulose acetate silk blue.

0.1 gram mole of 1,4-di-β-hydroxyethylamino anthraquinone can similarly be reacted with 0.1 gram mole of propionyl chloride, valeric anhydride and caproic anhydride, respectively, to obtain compounds wherein one hydroxyethyl group is converted to

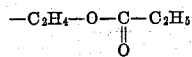

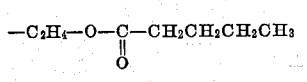

and

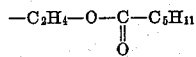

respectively.

Example 2

0.1 gram mole of 1,4-di-β-hydroxyethylamino anthraquinone is reacted in pyridine with about 0.1 gram mole (slight excess) of maleic anhydride. A hydroxyethyl group is converted to

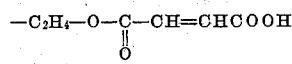

The dye compound obtained colors cellulose acetate silk blue.

0.1 gram mole of 1,4-di-β-hydroxyethylamino anthraquinone can similarly be reacted with 5 grams of formic acid to convert one of the hydroxyethyl groups to a

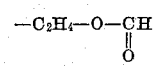

group. The dye compound obtained colors cellulose acetate silk blue.

Example 3

16.4 g. (0.05 mole) of 1,4-di-β-hydroxyethylamino anthraquinone were placed in 185 cc. of ethyl acetate. To the resulting mixture were added 5.1 g. (0.05 mole) of acetic anhydride. The resulting mixture was refluxed for one hour. The mixture was then diluted with 11 liters of water. The dye was filtered off and dried in the air. The yield was 13 g. The dye melted at 170° to 180° C.

The dye can be represented by the following formula:

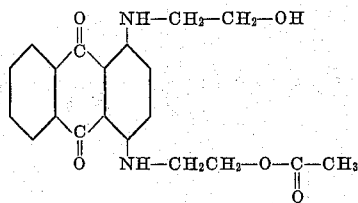

It dyed cellulose acetate silk blue.

Example 4

3.26 g. (0.01 mole) of 1,4-di-β-hydroxyethylamino anthraquinone were placed in 50 cc. of ethyl acetate, together with 1.68 g. (0.01 mole) of methoxy acetic anhydride. The mixture was refluxed for 30 minutes. It was then cooled and diluted with a large quantity of water. The dye was filtered off and dried in the air. A yield of 3 g. was obtained. The dye can be represented by the following formula:

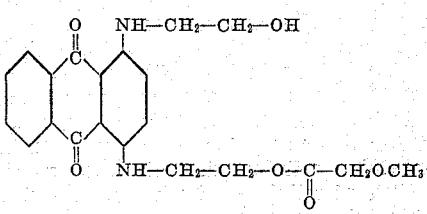

The dye colored cellulose acetate silk blue.

Example 5

3.26 g. (0.01 mole) of 1,4-di-β-hydroxyethylamino anthraquinone were placed in 50 cc. of ethyl acetate together with 1.58 g. (0.01 mole) of butyric anhydride. The mixture was refluxed for 30 minutes. It was then cooled and diluted with a large volume of water. The dye was filtered off and dried in the air. The yield was 3 g. The dye can be represented by the following formula:

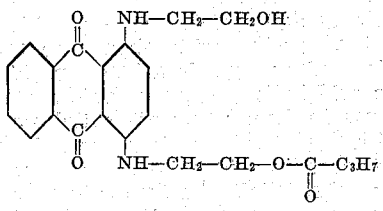

The dye colored cellulose acetate silk blue.

Example 6

3.26 g. (0.01 mole) of 1,4-di-β-hydroxyethylamino anthraquinone were placed in 50 cc. of ethyl acetate together with 2.26 g. (0.01 mole) of benzoic anhydride. The mixture was refluxed for 30 minutes. The mixture was then cooled and diluted with a large volume of aqueous sodium hydroxide (5 per cent by weight). The dye was filtered off, washed with water and dried. The yield was 3.55 g. The dye melted in hot water. The dye can be represented by the following formula:

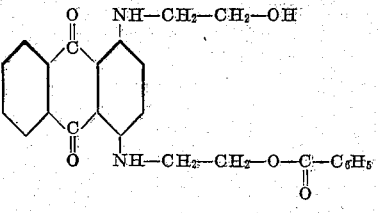

It colored cellulose acetate silk blue-green.

Example 7

3.26 g. (0.01 mole) of 1,4-di-β-hydroxyethylamino anthraquinone were placed in 50 cc. of ethyl acetate along with 1.86 g. (0.01 mole) of valeric anhydride. The mixture was refluxed for one hour. It was then cooled and diluted with 2 liters of water. The dye was filtered off, washed with water and dried in the air. The yield was 3.2 g. The dye can be represented by the following formula:

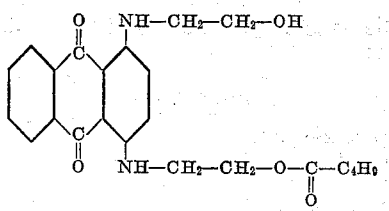

The dye colored cellulose acetate silk blue.

Example 8

16.3 g. (0.05 mole) of 1,4-di-β-hydroxyethylamino anthraquinone were placed in 250 cc. of ethyl acetate together with 6.5 g. (0.05 mole) of propionic anhydride. The mixture was refluxed for one hour. The mixture was then cooled and diluted with 4 liters of water. The dye was filtered off, washed with water and dried in the air. The yield was 15.3 g. The dye can be represented by the following formula:

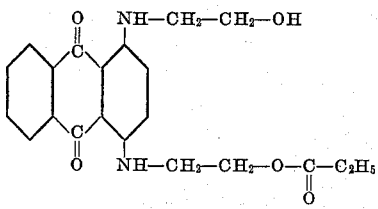

The dye colored cellulose acetate silk blue.

Example 9

100 g. (0.31 mole) of 1,4-di-β-hydroxyethylamino anthraquinone were placed in 500 cc. of dry pyridine. The mixture was heated to refluxing, and 35 g. (0.34 mole) of acetic anhydride were run into the mixture over a period of 30 minutes. After the addition of the acetic anhydride, the mixture was refluxed for one hour. The mixture was then cooled and diluted with 10 liters of water. Sodium chloride was added to the diluted mixture to salt out the dye. The dye was filtered off and dried in the air. The yield was 93 g.

Example 10

3.26 g. (0.01 mole) of 1,4-di-β-hydroxyethylamino anthraquinone were placed in 15 cc. of dry pyridine. To the resulting mixture were added dropwise 1.3 g. (0.01 mole) of propionic anhydride dissolved in pyridine. The resulting mixture was refluxed for one hour. The mixture was then cooled and poured into 300 to 500 cc. of water. Sodium chloride was added to the diluted mixture to salt out the dye. The dye was filtered off, washed with water and dried in the air.

Example 11

1 g. of 1-β-hydroxyethylamino-4-β-chloracetoxyethylamino anthraquinone (obtained according to Example 1) was heated in water for one hour. 1 g. of sodium bicarbonate was then added to the mixture and boiling was continued for three hours. The resulting mixture was allowed to stand for a period of about 12 hours. The dye was then filtered off, washed with cold water and dried in the air. The dye had the following formula:

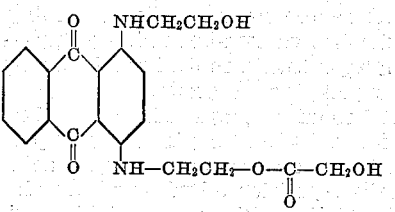

Example 12

3.26 g. (0.01 mole) of 1,4-di-β-hydroxyethylamino anthraquinone were placed in 15 cc. of dry pyridine. To the resulting mixture were added dropwise 2.26 g. (0.01 mole) of benzoic anhydride dissolved in pyridine. The resulting mixture was refluxed for two hours. It was then cooled and diluted with cold water. Sodium chloride was added to the diluted mixture to salt out the dye. The dye was filtered off and dried in the air.

In a manner similar to that illustrated above, still other dyes containing both a hydroxyalkyl group and a hydroxyalkyl radicle esterified with an organic acid radicle can be prepared.

The dyestuffs may be sulfated so as to convert any alkyl group into sulfo alkyl groups. Sulfation may be effected by treatment with strong sulfuric acid.

The dyestuffs produced according to this invention have valuable dyeing properties for organic derivatives of cellulose. They are of greatest importance in the coloration of textile materials containing organic derivatives of cellulose, such as cellulose acetate, cellulose propionate, or cellulose butyrate. The dyestuffs can also be employed to dye cellulose ethers, for example, ethyl or benzyl cellulose. The new dyestuffs may also be employed in the coloration of mixed materials comprising one or more of the aforesaid esters or ethers in admixture with other textile fibers, for example wool, silk or other animal fibers, or cotton, regenerated cellulose or other cellulosic materials. Such other fibers may be colored by the same dyestuffs as the cellulose esters and ethers when they possess the requisite affinity, or they may be colored in the same or different shades by means of other dyestuffs, before, after or simultaneously with the coloration of the cellulose esters or ethers.

The dyes are ordinarily applied to the textile materials in the form of an aqueous suspension which may be prepared by grinding the dye to a paste in the presence of soap or other suitable dispersing agent, and dispersing the resulting paste in water. Dyeing operations may be conducted at a temperature of 80° to 85° C., but any suitable temperature may be employed. In accordance with the usual dyeing practice, the material to be dyed will ordinarily be added to the dye bath at a temperature lower than that at which the main portion of the dyeing is to be effected, e. g. a temperature of from 45° to 55° C., following which the temperature of the dye bath will be raised to that selected for carrying out the operation. The temperature at which the dyeing operation is directed will vary depending upon the particular material being dyed. Dispersing or solubilizing agents that can be employed for preparing suspensions of the dyes include soap, sulphoricinoleic acid, salts of sulphoricinoleic acid and of sulphonated oleic acid, etc.

What we claim as our invention and desire to be secured by Letters Patent of the United States is:

1. Anthraquinone dyestuffs containing in the 1-position a hydroxyalkylamino group esterified with an organic acid radical and in the 4-position a hydroxyalkylamino group.

2. Anthraquinone dyestuffs containing in the 1-position a hydroxyalkylamino group esterified with a lower alkyl monocarboxylic acid radical and in the 4-position a hydroxyalkylamino group.

3. The anthraquinone dyestuff having the formula:

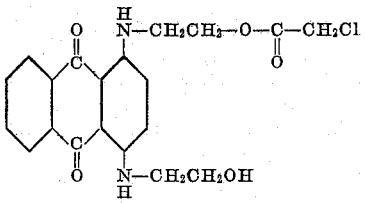

4. The anthraquinone dyestuff having the formula:

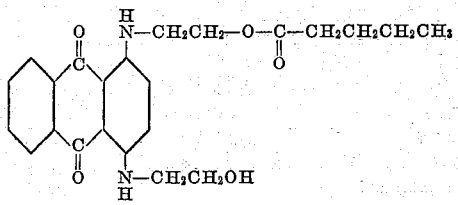

5. The anthraquinone dyestuff having the formula:

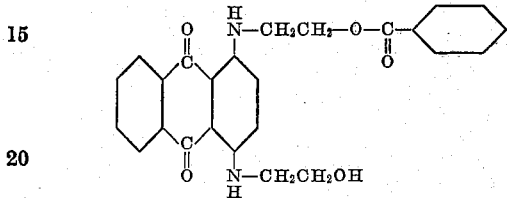

JOSEPH B. DICKEY.
JAMES G. McNALLY.